Jan. 19, 1971  L. A. TOTH  3,556,618
DOUBLE RACE SCREWDOWN THRUST BEARING
Filed Dec. 11, 1968  2 Sheets-Sheet 1

INVENTOR
LEO A. TOTH

BY Mason, Porter, Diller & Brown
ATTORNEYS

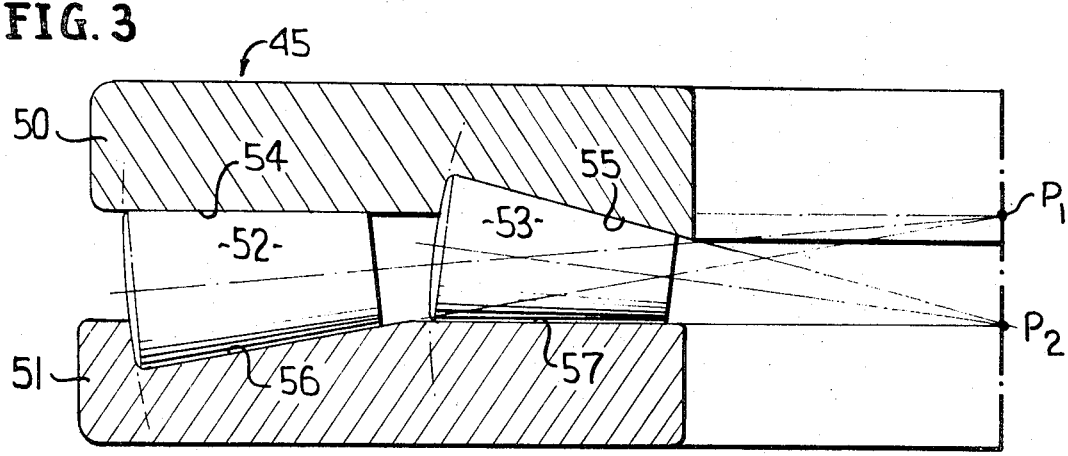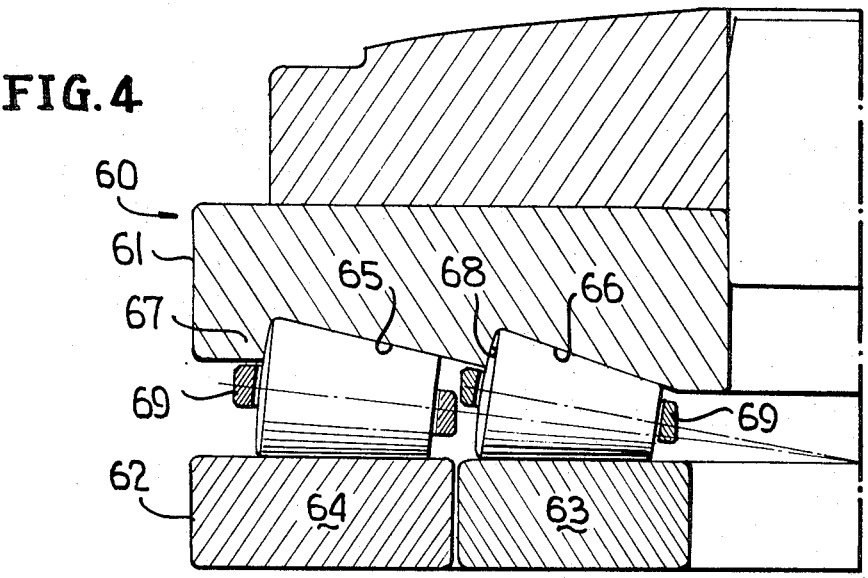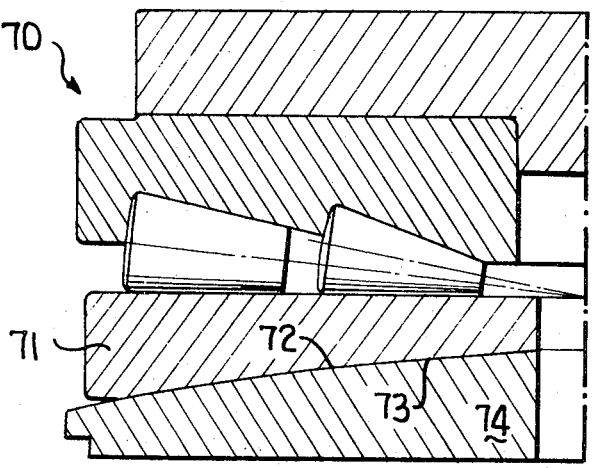

United States Patent Office 3,556,618
Patented Jan. 19, 1971

3,556,618
DOUBLE RACE SCREWDOWN THRUST BEARING
Leo A. Toth, South Bend, Ind., assignor to The Torrington Company, Torrington, Conn., a corporation of Maine
Filed Dec. 11, 1968, Ser. No. 782,805
Int. Cl. F16c *17/06*
U.S. Cl. 308—231          16 Claims

ABSTRACT OF THE DISCLOSURE

This disclosure relates to screwdown thrust bearings for use in rolling mills or the like. The bearing is provided with two concentric rows of tapered rollers instead of a single row of rollers. For a given axial load the rollers in each of the two concentric rows are shorter and thinner than would be the rollers in a single row capable of carrying the same load. The geometry of the rollers in the double rows is such that the radial component of axial thrust transmitted to the rollers in each of the rows is reduced thereby decreasing the contact stress on guide flanges which are provided to restrain the rollers from radial outward movement.

---

This invention relates to thrust bearings and more particularly to screwdown thrust bearings for use in rolling mills or other applications wherein the screw or other members transmitting axial loads must be rotatable relative to the bearing.

Screwdown thrust bearings have been used for many years in rolling mill stands because of their ability to provide a low friction means of adjusting the spacing between the work rolls in small, precise amounts as is required in the current practice of rolling metal billets, plates and strips at relatively high speed.

The use of tapered rollers in thrust bearings is also well known in the art. The tapered rollers are positioned in conical raceways with the rollers having a common vertex at the bearing center. This provides true geometric rolling of the rollers, and thus minimum friction, upon rotation of the mill screw relative to the bearing surfaces. However, because the rollers are so tapered they are caused to be urged radially outward by the radial components of axial loads transmitted by the mill screw. In order to obtain radial stability of the rollers, the bearing races are provided with guide flanges which restrain the rollers against radially outward movements. The guide flanges engage the ends of the rollers and thus absorb the full radial component of the axial thrust loads carried by the bearing.

Because of the high stresses that are developed at the roller guide flanges, lubrication at these points becomes critical and undesirable deviations in bearing geometry have been made in an attempt to overcome the difficulties. In order to facilitate the flow of lubricating fluid at these points the roller-guide flange surface area contact has been reduced by generating the spherical end of the rollers to a smaller radius than the spherical surface of the guide flange. Although this improves lubrication it also results in decreased roller guidance which causes the rollers to become skewed with undesirable skidding and galling.

Another problem that arises with the use of tapered rollers is that as larger bearings are developed to carry greater loads, and thus greater section thickness of the rollers is required, the ratio of the roller diameters of the large to small ends increases considerably. This results in high stresses at the small ends of the rollers and limits acceptable bearing capacity to this particular point of design. Moreover, as the rollers' length and taper angle are increased the radial component of the axial thrust forces carried by the roller is thus also increased thereby accentuating the stress factor at the guide flange.

It is an object of this invention to improve the lubrication characteristics of tapered roller thrust bearings without sacrificing true geometric rolling of the rollers.

Another object of this invention is to provide a tapered roller thrust bearing that is capable of carrying a maximum capacity thrust load within a minimum height and with rollers having a minimum cross section.

Still another object of this invention is to increase the maximum load carrying capacity of tapered roller thrust bearings by providing rollers having an increased diameter at their small ends, within a bearing of a given height, and thus increase the stress carrying capability at this point of the design.

More particularly, it is an object of this invention to increase the guide flange surface area in tapered roller thrust bearings as well as to decrease the radial components of axial thrust loads transmitted by the rollers to the guide flange. These objects are accomplished by providing two concentric rows of rollers instead of a single row of rollers, the rollers in each of the two concentric rows being shorter and thinner than the rollers in a single row capable of carrying the same load.

Although the rollers in each of the two rows are shorter and thinner than would be the rollers in a single row, they are capable of carrying at least the same load because they represent an equivalent bearing surface due to the fact that the small ends of the shorter rollers are thicker than the small ends of longer rollers even though the diameters of their large ends are less than the diameters of the large ends of the longer rollers.

The use of multiple rows of rollers within a bearing of a given diameter, instead of a single row of rollers, allows for the use of an increased number of rollers and thus the axial load, and hence its radial components, carried by each of the rollers is reduced. This of course results in less contact stress between each roller and its corresponding portion of the guide flange surface area and thus permits better lubrication characteristics at these points without the need for sacrificing geometric conformity between the spherical end radii of the rollers and the spherical radius of the guide flange. Moreover, the unit stress on the guide flanges is further reduced by the fact that the shorter length and decreased angle of taper of the rollers in a single row, further decrease the radial component of axial loads transmitted to each roller. This of course further reduces the stress on the guide flanges.

Splitting up the roller length into two rows of rollers permits a given load to be carried by a bearing of lesser height than the height of a bearing having a single row of longer rollers because the small ends of the shorter rollers are thicker than the small ends of the longer rollers, and thus provide an increased bearing surface, even though the large ends of the longer rollers have a greater diameter than the large ends of the shorter rollers. Moreover, the fact that the diameters at the small ends of the shorter rollers are larger than the diameter at the small ends of the longer rollers results in a greater small end-race surface contact area with short rollers than with long rollers and hence the unit contact stress is reduced resulting in an increased load carrying capacity of the bearing.

With the above and other objects in view that will hereinafter appear, the nature of the invention will be more clearly understood by reference to the following detailed description, the appended claimed subject matter and the several views illustrated in the accompanying drawings.

In the drawings:

FIG. 3 is a vertical sectional view taken through one-half of another form of a multiple row tapered roller thrust bearing, and illustrates a conical race surface formed in each of a pair of bearing races.

FIG. 4 is a vertical sectional view taken through one-half of another form of a multiple row roller thrust bearing, and illustrates a lower bearing race formed in two parts whereby the thickness of each part can be independently varied during manufacture in order to obtain proper load distribution for the respective races.

FIG. 5 is a vertical sectional view taken through one-half of another form of a multiple row roller thrust bearing of this invention, and illustrates a lower bearing race having a concave surface formed in its underside so as to facilitate alignment with a mill screw or other axial thrust transmitting member.

Figure 1:
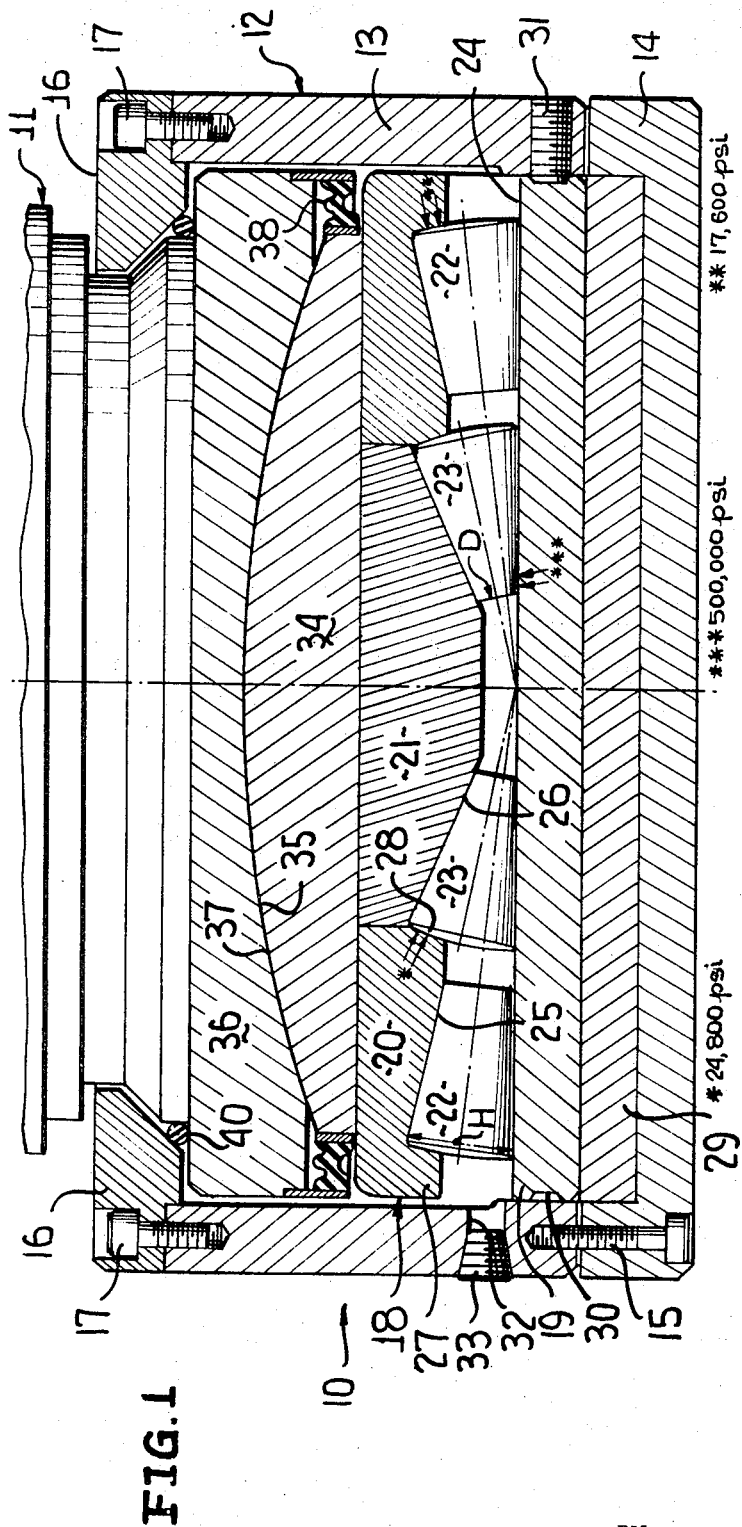
FIG. 1 is a vertical sectional view taken through a multiple row tapered roller thrust bearing of this invention, and illustrates a mill screw, the major portion of which is cut away, or other member adapted to transmit an axial load, rotatably mounted relative to the bearing.

Referring now to the drawings in detail, there is illustrated in FIG. 1 a tapered roller thrust bearing or bearing unit generally referred to by the numeral 10. The bearing unit 10 is shown coupled to a mill screw or similar member 11 through which axial loads are transmitted to the bearing unit 10. The bearing unit 10 includes a housing 12 having an intermediate sleeve portion 13, a bottom portion 14 coupled to the intermediate portion 13 by means of screws 15, and a top portion formed by part-circular ring members 16 coupled to the intermediate portion 13 by means of screws 17.

The bearing unit 10 further includes upper and lower race members 18 and 19, respectively. The upper race member 18 is comprised of two distinct portions, an outer ring portion 20 and an inner circular portion 21. The outer portion 20 forms, in cooperation with the lower race member 19, an outer raceway in which is disposed a plurality of tapered rollers 22. Similarly, the inner circular portion 21 forms, in cooperation with the lower race member 19, an inner raceway in which is disposed a plurality of tapered rollers 23.

The lower race member 19 includes a race surface 24 disposed normal to the bearing axis while the outer and inner portions 20, 21 of the upper race member 18 include generally frusto-conical race surfaces 25 and 26, respectively, which are directed inward and inclined relative to the bearing axis. In order to assure true geometric rolling the bearings in each raceway have a common vertex on the bearing axis.

Due to the taper of the rollers 22 and 23 and their engagement with the inclined surfaces 25 and 26 respectively, the radial component of axial loads transmitted to the bearing unit 10 by the screw 11 causes the rollers 22 and 23 to be urged radially outward from the bearing axis. The outer ring portion 20 of the upper race member 18 is therefore formed with an outer depending rim or guide flange 27 and an inner guide flange surface 28 which serve to restrain the outer and inner rollers 22, 23, respectively, against radially outward movement.

The lower race member 19 is spaced from the lower portion 14 of the housing 12 and is supported by a conventional load sensing mechanism 29 which is in turn coupled to a mechanism (not shown) for rotating the screw 11 to selectively increase or decrease the load. The lower race member 19 is also formed with an outer annular groove 30 by which it is engaged by a setscrew 31 which passes through the intermediate portion 13 of the housing 12 to fix its position relative thereto. A port 32 may also be formed in the intermediate portion 13 of the housing 12 through which lubricating fluid may be admitted to the interior of the bearing. A plug 33 is provided to close the port 32.

A member 34 having a convex upper surface 35 is positioned on top of the upper race member 18. Another member 36 having a concave lower surface 37 is positioned on top of the member 34 with the spherical surfaces 35 and 37 in engagement. A flexible sealing ring 38 is provided between the members 34 and 36 to seal the inner face between the surfaces 35 and 37. The mating spherical surfaces 35 and 37 serve to center the screw 11 relative to the bearing unit 10 and maintain them in axial alignment.

A sealing ring 40 may also be provided to seal the interior of the bearing unit 10 at the point where it is coupled to the screw 11 by the part-circular ring members 16.

Figure 2:
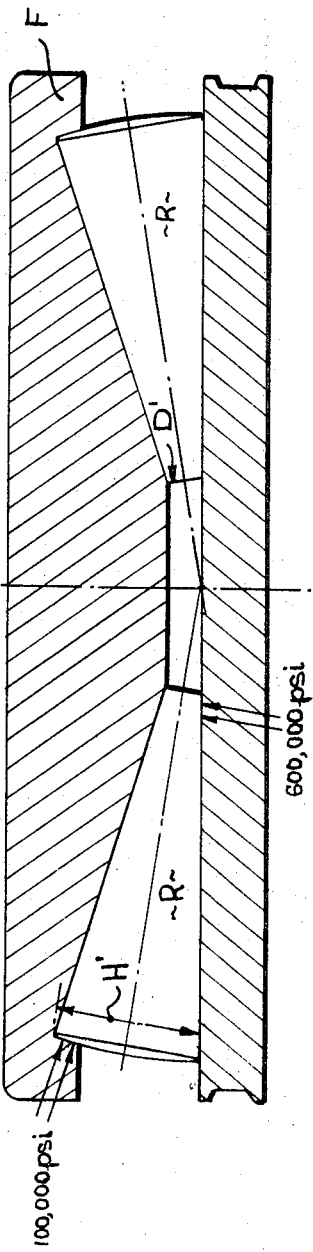
FIG. 2 is a vertical sectional view taken through a single row tapered roller thrust bearing of the prior art and having a load carrying capacity equivalent to that of the bearing illustrated in FIG. 1, and illustrates a single row of rollers that are longer and thicker than the rollers illustrated in FIG. 1.

FIG. 2 illustrates a single row tapered roller thrust bearing of the prior art having an identical thrust carrying capacity to that of bearing unit 10. As is readily apparent, the rollers R of the prior art bearing are longer than the rollers 22, 23 of bearing unit 10 and have a maximum thickness or height H' that is greater than the maximum thickness or height H of the rollers 22, 23 of bearing unit 10.

For a thrust load of 19 million pounds it has been calculated that the contact pressure between each of the rollers R and its guide flange F is 100,000 p.s.i. However, for the same load the contact pressure between each roller 22 and the outer guide flange 27 is only 17,600 p.s.i., and between each roller 23 and its guide flange surface 28 is only 24,800 p.s.i. The difference between the pressures exerted by the rollers 22 and 23 is because there are more rollers 22 in the outer raceway than there are rollers 23 in the inner raceway. It is thus apparent that by using a double row of rollers the guide flange contact stress for a given load is substantially reduced over the guide flange contact stress in bearings having only a single row of rollers.

Furthermore, the geometry of the rollers R of the prior art bearing is such that the diameter D' at their small ends is less than the diameter D at the small ends of the rollers 23 of the bearing unit 10. Consequently, the small ends of the rollers 23, and obviously the small ends of the rollers 22 which are even larger than the small ends of the rollers 23, have a greater roller-race surface contact area than the roller-race surface contact area between the small ends of the rollers R and the race surface of the prior art bearing. As a result, the race to roller contact stress at the small ends of the rollers in bearing unit 10 is less than the race to roller contact stress at the small ends of the rollers in the prior art bearing. For a thrust load of 19 million pounds this stress calculates to be approximately 600,000 p.s.i. for the prior art bearing and 500,000 p.s.i. for bearing unit 10. Although high in both instances, the reduced stress calculated for the bearing of this invention result in better performance and longer bearing life.

Referring now to another double row tapered roller thrust bearing 45 illustrated in FIG. 3, it can be seen that there is provided an upper and a lower race member 50 and 51, respectively, which form two distinct bearing raceways in which are disposed a plurality of outer and inner tapered rollers 52 and 53, respectively.

The upper race member 50 is formed with an outer race surface 54 which is disposed normal to the bearing axis and a generally frusto-conical inner race surface 55 which is directed inward and inclined relative to the bearing axis. Conversely, the lower race member 51 is formed with an outer race surface 56 which is generally frusto-conical and directed inward and inclined relative to the bearing axis while its inner race surface 57 is disposed normal to the bearing axis. With the bearing raceways formed in this manner, the common vertex formed by the rollers in each raceway will be at two different points P1, P2 on the bearing axis. This design will result in less stress on the guide flanges as compared with the design illustrated in FIG. 1. The same comparisons that were made as between bearing unit 10 and the prior art bearing illustrated in FIG. 2 can be made as between bearing 45 and the prior art bearing except that the stress characteristics will be changed because of the difference in design.

FIG. 4 illustrates yet another tapered roller thrust bearing having two rows of rollers and is referred to generally by the numeral 60. The bearing 60 includes an upper race member 61 and a lower race member 62.

The bearing 60 differs from the bearing 10 illustrated in FIG. 1 in that the upper race member 61 is formed of a single member while the lower race member 62 is formed of inner and outer portions 63 and 64, respectively. The upper race member 61 includes outer and inner inclined frusto-conical race surfaces 65 and 66, respectively, and guide flanges formed by a depending rim 67 and an inner flange surface 68.

The bearing 60 lends itself to more accurate and inexpensive manufacture as compared to the bearing unit 10 inasmuch as both conical bearing surfaces 65 and 66 are produced in the same member with all grinding operations being done in the same setting. The tapered races and the guide flanges 67 and 68 may be all referenced from the same locating surfaces making each concentric with the other. In addition, the fact that the lower bearing race is made of separate portions 63, 64 permits the thickness of each portion to be independently varied, if necessary, in order to obtain proper load distribution for the respective races during manufacture. Retainers 69 may be provided to help guide the rollers in their respective raceways.

A double row tapered roller thrust bearing 70 is illustrated in FIG. 5 and differs from the bearings previously illustrated and described principally in that it is provided with a lower bearing race 71 that is formed with a concave lower surface 72 that cooperates with a convex upper surface 73 of a lower support member 74 to maintain the bearing 70 and an axial thrust transmitting member (not shown) in axial alignment.

The same comparisons that were made as between bearing unit 10 and the prior art bearing illustrated in FIG. 2 may also be made between bearings 60 and 70 and the prior art bearing.

From the foregoing, it should be readily apparent that there is provided a novel tapered roller thrust bearing in which the radial component of axial loads has been materially reduced by using shorter rollers and wherein the provision of a double row of rollers permits the use of a greater number of rollers and hence a reduction in stress at the roller guide flanges.

The novel concept of using a double row of rollers also permits thinner rollers to be utilized, as compared with the thickness of a single row of rollers capable of carrying the same load, and hence a maximum load capacity is available within a minimum height and bearing cross section with consequent reduction in weight over bearings using a single row of rollers.

Furthermore, since the rollers are shorter, better load distribution is available along the roller length under conditions of misalignment in operation of the bearing in the screwdown position.

Although only preferred embodiments of the invention have been specifically illustrated and described herein, it is to be understood that minor variations may be made without departing from the spirit of the invention.

I claim:

1. A thrust bearing comprising first and second race members, said race members defining a plurality of concentric bearing raceways, a plurality of tapered rollers disposed in each of said raceways such that said rollers will be urged radially outward under the influence of axial loads applied to said bearing, means associated with each of said raceways for confining said rollers against radial outward movement, each of said raceways including a race surface associated with one of said race members in a plane normal to the bearing axis, and a generally frusto-conical race surface associated with the other race member directed inward and inclined relative to the bearing axis.

2. A thrust bearing as defined in claim 1 wherein said confining means are guide flanges formed integrally with at least one of said race members.

3. A thrust bearing comprising first and second race members, said race members defining a plurality of concentric bearing raceways, a plurality of tapered rollers disposed in each of said raceways such that said rollers will be urged radially outward under the influence of axial loads applied to said bearing, means associated with each of said raceways for confining said rollers against radial outward movement, each of said race members includes both a race surface in a plane normal to the bearing axis and a generally frusto-conical race surface directed inward and inclined relative to the bearing axis.

4. A thrust bearing as defined in claim 1 wherein said rollers in each of said raceways have a common vertex on the bearing axis.

5. A thrust bearing comprising first and second race members, said race members defining a plurality of concentric bearing raceways, a plurality of tapered rollers disposed in each of said raceways such that said rollers will be urged radially outward under the influence of axial loads applied to said bearing, means associated with each of said raceways for confining said rollers against radial outward movement, said rollers in each of said raceways have a common vertex on the bearing axis, and the common vertex defined by the rollers in each raceway is at a different point on the bearing axis.

6. A thrust bearing as defined in claim 1 wherein one of said race members is formed of a plurality of separate parts, the number of said parts corresponding to the number of said raceways provided.

7. A thrust bearing as defined in claim 6 wherein each of said sepearate parts defines a race surface in association with each of said raceways.

8. A thrust bearing as defined in claim 7 wherein said race surface is in a plane normal to the bearing axis.

9. A thrust bearing comprising first and second race members, said race members defining a plurality of concentric bearing raceways, a plurality of rollers disposed in each of said raceways, one of said race members being defined by separate inner and outer members having respective first and second ones of said bearing raceways, and means defined by said outer member for confining rollers on both said first and second bearing raceways against radial movement.

10. The thrust bearing as defined in claim 9 wherein said confining means confine rollers on both said first and second bearing raceways against radial outward movement.

11. The thrust bearing as defined in claim 9 wherein said outer member is of an annular configuration, and said inner member is disposed within said annular outer member.

12. The thrust bearing as defined in claim 9 wherein said confining means confine rollers on both said first and second bearing raceways against radial outward movement, said outer member is of an annular configuration, and said inner member is disposed within said annular outer member.

13. The thrust bearing as defined in claim 3 wherein said normal race surfaces and said frusto-conical race surfaces are in opposed relationship.

14. The thrust bearing as defined in claim 13 wherein said race members are each of a one-piece construction.

15. The thrust bearing as defined in claim 5 wherein said normal race surfaces and said frusto-conical race surfaces are in opposed relationship.

16. A thrust bearing comprising first and second race members, said race members defining a plurality of concentric bearing raceways, a plurality of tapered rollers disposed in each of said raceways such that said rollers will be urged radially outward under the influence of axial loads applied to said bearing, each of said bearing raceways being defined by a race surface in a plane normal to the bearing axis opposing a generally frustoconical race surface inclined relative to the bearing axis, one of said first and second race members being formed as two separate elements, and each of said normal race surfaces being formed on a respective one of said two separate elements.

References Cited

UNITED STATES PATENTS 3,199,329  8/1965  Toth _____ 308—231

FOREIGN PATENTS 46,499              Germany _____ 308—231
541,459  11/1941  Great Britain _____ 308—234

FRED C. MATTERN JR., Primary Examiner

F. SUSKO, Assistant Examiner